United States Patent
Seubert et al.

(10) Patent No.: US 10,518,751 B2
(45) Date of Patent: Dec. 31, 2019

(54) VEHICLE IMAGE SENSOR CLEANING

(71) Applicant: Ford Global Technologies, LLC, Dearborn, MI (US)

(72) Inventors: Christopher Michael Seubert, New Hudson, MI (US); Mark Edward Nichols, Saline, MI (US); Cindy Anne Peters, Canton, MI (US); Kerrie Nikaido Holguin, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 226 days.

(21) Appl. No.: 15/708,015

(22) Filed: Sep. 18, 2017

(65) Prior Publication Data
US 2019/0084526 A1   Mar. 21, 2019

(51) Int. Cl.
| | |
|---|---|
| B60S 1/08 | (2006.01) |
| G06K 9/00 | (2006.01) |
| G06T 7/00 | (2017.01) |
| H04N 5/217 | (2011.01) |
| B60R 11/04 | (2006.01) |
| B60R 11/00 | (2006.01) |
| B60S 1/04 | (2006.01) |

(52) U.S. Cl.
CPC ........ *B60S 1/0822* (2013.01); *G06K 9/00791* (2013.01); *G06T 7/001* (2013.01); *H04N 5/2171* (2013.01); *B60R 11/04* (2013.01); *B60R 2011/004* (2013.01); *B60S 1/04* (2013.01); *G06T 2207/10004* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 7,983,447 B2 | 7/2011 | Higuchi et al. | |
| 9,126,534 B2 | 9/2015 | Snider | |
| 9,245,333 B1 | 1/2016 | Beck et al. | |
| 9,445,057 B2 | 9/2016 | May et al. | |

FOREIGN PATENT DOCUMENTS

| | | |
|---|---|---|
| EP | 1498721 A1 | 1/2005 |
| WO | 2014007286 A1 | 1/2014 |

*Primary Examiner* — Eric W Golightly
(74) *Attorney, Agent, or Firm* — Frank A. MacKenzie; Bejin Bieneman PLC

(57) ABSTRACT

A vehicle computer includes a memory and a processor programmed to execute instructions stored in the memory. The instructions include comparing a captured image of a predetermined object to a target image of the predetermined object to quantify a first noise characteristic of the captured image, comparing the first noise characteristic to a first predetermined threshold, and detecting debris on an image sensor that outputs the captured image as a result of comparing the first noise characteristic to the first predetermined threshold.

20 Claims, 3 Drawing Sheets

VEHICLE IMAGE SENSOR CLEANING

BACKGROUND

Cameras serve various roles in automobiles. They can be used for autonomous vehicle operation, to identify passengers, to assist the driver with performing various maneuvers (e.g., backing into a parking space), etc. Images captured by the camera can be shown in real-time (e.g., a live video stream) inside the passenger compartment of the vehicle or saved for behind-the-scenes processing.

DETAILED DESCRIPTION

Figure 1:
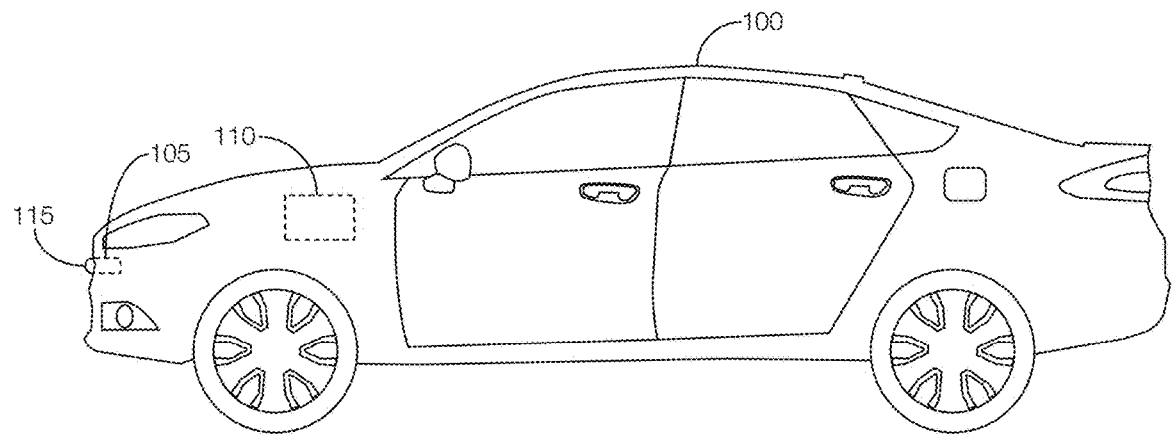
FIG. 1 illustrates an example host vehicle with an image sensor and a debris detection system.

Anything on the exterior surface of a vehicle is bound to get dirty. This includes exterior vehicle sensors. In the case of image sensors, such as cameras, the lens covering the sensor is exposed to the elements. Over time, the lens will collect dust, salt, snow, dirt, frost, rain, bird droppings, insects, and other debris that obstructs the view of the image sensor. As such, debris on the lens will reduce the quality of the images captured by the image sensor.

A human driver can determine whether an image sensor is obstructed by simply looking at the images captured by the image sensor. If the debris is too great, the human driver can exit the vehicle and clean off the image sensor before continuing to operate the vehicle. Debris blocking the image sensor is more problematic for autonomous vehicles, especially autonomous vehicles operating without any human passengers. Thus, autonomous vehicles may benefit from a system that detects debris obstructing the view of the image sensor.

Such a system may be implemented via a vehicle computer having a memory and a processor programmed to execute instructions stored in the memory. The instructions include comparing a captured image of a predetermined object to a target image of the predetermined object to quantify a first noise characteristic of the captured image, comparing the first noise characteristic to a first predetermined threshold, and detecting debris on an image sensor that outputs the captured image as a result of comparing the first noise characteristic to the first predetermined threshold.

The first noise characteristic may be at least one of a signal-to-noise ratio and a peak signal-to-noise ratio. In that instance, detecting debris on the image sensor may include detecting debris on the image sensor as a result of determining that the first noise characteristic is below the first predetermined threshold. The instructions may further include comparing the captured image to the target image to quantify a second noise characteristic of the captured image. In that case, the second noise characteristic may include at least one of a root mean squared error and a mean absolute error. Further, detecting debris on the image sensor may include detecting debris on the image sensor as a result of determining that the second noise characteristic exceeds a second predetermined threshold.

In one example implementation, detecting debris on the image sensor may include detecting debris on the image sensor as a result of the determining that the first noise characteristic is below the first predetermined threshold and the second noise characteristic exceeds the second predetermined threshold.

The instructions may include initiating cleaning of the image sensor as a result of detecting debris on the image sensor. Initiating cleaning of the image sensor may include outputting a control signal to a sensor cleaning system.

The instructions may include identifying the predetermined object in an original image captured by the image sensor.

The instructions may include generating the captured image by manipulating the original image captured by the image sensor. Manipulating the original image may include at least one of cropping the original image and normalizing the original image. Normalizing the original image may include adjusting at least one of an exposure, a brightness, and an orientation of the predetermined object in the original image. Cropping the original image may include removing sections of the original image that do not represent the predetermined object.

An example method may include comparing a captured image of a predetermined object to a target image of the predetermined object to quantify a first noise characteristic of the captured image, comparing the first noise characteristic to a first predetermined threshold, and detecting debris on an image sensor that output the captured image as a result of comparing the first noise characteristic to the first predetermined threshold.

The first noise characteristic may be at least one of a signal-to-noise ratio and a peak signal-to-noise ratio. In that instance, detecting debris on the image sensor may include detecting debris on the image sensor as a result of determining that the first noise characteristic is below the first predetermined threshold. The method may further include comparing the captured image to the target image to quantify a second noise characteristic of the captured image. The second noise characteristic may include at least one of a root mean squared error and a mean absolute error. Detecting debris on the image sensor may include detecting debris on the image sensor as a result of determining that the second noise characteristic exceeds a second predetermined threshold.

In one possible approach, detecting debris on the image sensor may include detecting debris on the image sensor as a result of the determining that the first noise characteristic is below the first predetermined threshold and the second noise characteristic exceeds the second predetermined threshold.

The method may further include initiating cleaning of the image sensor as a result of detecting debris on the image sensor.

The method may further include identifying the predetermined object in an original image captured by the image sensor.

The method may further include generating the captured image by manipulating the original image captured by the image sensor. Manipulating the original image may include at least one of cropping the original image and normalizing the original image. Normalizing the original image may include adjusting at least one of an exposure, a brightness, and an orientation of the predetermined object in the original image. Cropping the original image may include removing sections of the original image that do not represent the predetermined object.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the host vehicle 100 includes an image sensor 105 and a debris detection system 110. Although illustrated as a sedan, the host vehicle 100 may include any passenger or commercial automobile such as a car, a truck, a sport utility vehicle, a crossover vehicle, a van, a minivan, a taxi, a bus, etc. As discussed in greater detail below, the host vehicle 100 is an autonomous vehicle that can operate in an autonomous (e.g., driverless) mode, a partially autonomous mode, and/or a non-autonomous mode.

The image sensor 105 is implemented via circuits, chips, or other electronic components that capture images of objects external to the host vehicle 100. Thus, the image sensor 105 may be located on the exterior of the host vehicle 100. To capture images external to the host vehicle 100, the image sensor 105 may include a lens 115 that projects light toward, e.g., a CCD sensor, a CMOS sensor, etc. The image sensor 105 processes the light and generates the image. The image may be output to the debris detection system 110, as discussed in greater detail below. The images captured by the image sensor 105 can be used to determine if the lens 115 is dirty (e.g., has debris that reduces the quality of the images captured by the image sensor 105). The image captured by the image sensor 105 that is used to determine if the lens 115 is dirty may be referred as the "captured image" below. In some instances, a protective cover or shield may cover the lens 115. The protective shield or cover may be transparent. Discussions below of debris on the lens 115 may refer to debris on the protective cover or shield.

The debris detection system 110 analyzes images captured by the image sensor 105 and determines if the image sensor 105 is dirty (e.g., that there is debris on the lens 115 of the image sensor 105) by comparing the captured image to a target image. The target image may refer to a "clear" image of a predetermined object. That is, the target image may represent what the predetermined object would look like if captured by an unobstructed image sensor 105. As such, the target image may represent an image of the predetermined object with little to no noise. As explained in greater detail below, the debris detection system 110 may determine that the image sensor 105 requires cleaning if the amount of noise in the captured image exceeds a threshold. The amount of noise in the captured image may be determined by comparing the captured image to the target image. Since the target image and captured image may be of the same predetermined object (such as a sign along a roadway), differences in the images may be interpreted as noise. Since debris may cause the images to be different, the greater amount of debris on the lens 115 may result in more noise. If the debris detection system 110 determines that the amount of noise is outside an acceptable limit, the debris detection system 110 may determine that the image sensor 105 should be cleaned. Cleaning the image sensor 105 may include activating a sprayer, an air blower, a wiper, or a combination thereof, that can clean the exterior surface of the lens. Alternatively or in addition, cleaning the image sensor 105 can include scheduling maintenance, vibrating the lens 115, rotating the lens 115, moving the cover, etc.

Figure 2:
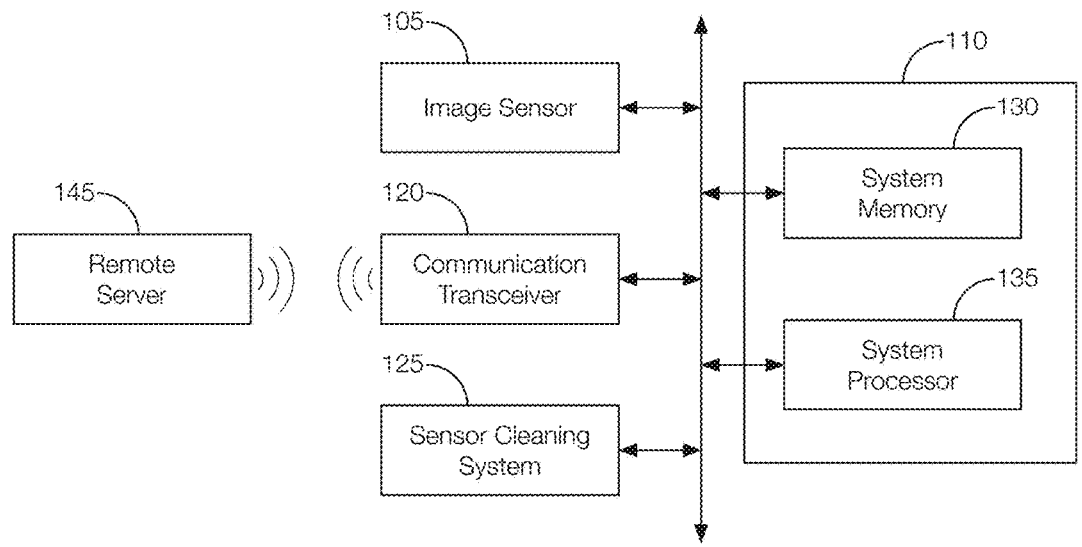
FIG. 2 is a block diagram showing example components of the host vehicle, including components of the debris detection system.

Referring now to FIG. 2, components of the debris detection system 110 may communicate with components of the host vehicle 100 such as the image sensor 105, a communications transceiver 120, a sensor cleaning system 125, etc. The debris detection system 110 may include a system memory 130 and a system processor 135. In some possible approaches, the debris detection system 110 is implemented via a vehicle computer. The components of the debris detection system 110 and the host vehicle 100 may communicate over a vehicle communication network 140 in accordance with any number of protocols such as a Controller Area Network (CAN) bus protocol, Ethernet, a Local Interconnect Network (LIN) protocol, Bluetooth®, Bluetooth® Low Energy, or the like.

The communications transceiver 120 is implemented via an antenna, circuits, chips, or other electronic components that facilitate wireless communication between components of the host vehicle 100 and, e.g., a remote server 145. The communications transceiver 120 may be programmed to communicate in accordance with any number of wired or wireless communication protocols. For instance, the communications transceiver 120 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc. In some instances, the communications transceiver 120 is incorporated into a vehicle telematics unit. The communications transceiver 120 may be programmed to communicate with the remote server 145 to, e.g., schedule maintenance, including cleaning of the image sensor 105.

The sensor cleaning system 125 may include, e.g., a washer fluid sprayer and a wiper. In response to a control signal, which could include a control signal output by the system processor 135, discussed below, the washer fluid sprayer may spray washer fluid onto the lens 115 of the image sensor 105. The wiper may be activated to clear the washer fluid and debris from the lens 115 of the image sensor 105.

The system memory 130 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The system memory 130 may store instructions executable by the system processor 135 and data such as one or more captured images, the target image, or both. The instructions and data stored in the memory may be accessible to the system processor 135 and possibly other components of the debris detection system 110, the host vehicle 100, or both.

The system processor 135 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The system processor 135 may be programmed to receive the captured images generated by the image sensor 105. The system processor 135 may be programmed to receive the captured image directly from the image sensor 105. The system processor 135 may be programmed to access captured images stored in the system memory 130.

The system processor 135 may be programmed to process the captured images to determine if the image sensor 105 needs to be cleaned. If so, the system processor 135 may be programmed to output a control signal to the sensor cleaning system 125. As explained above, the sensor cleaning system 125 may spray washer fluid and activate a wiper to remove the washer fluid and debris from the image sensor 105 as a result of receiving the control signal output by the system processor 135.

The system processor 135 may be programmed to periodically check whether the image sensor 105 is dirty. That is, the system processor 135 may be programmed to periodically monitor captured images for predetermined objects. A predetermined object may be an object associated with one or more target images stored in the system memory 130. Examples of predetermined objects may include objects that are relatively uniform. For instance, road signs are highly standardized. Thus, an example of a predetermined object may be a stop sign. Alternatively or in addition, the predetermined object may be an object designed specifically for the purpose of checking the cleanliness of the image sensor 105. For instance, the predetermined object may be a sign with a particular pattern located, e.g., along a roadway, in a service station, at a parking location of the host vehicle 100, or the like. The system processor 135 may be programmed to look for the predetermined object after a predetermined amount of time has elapsed, after the host vehicle 100 is driven a predetermined distance (based on, e.g., miles since the last time the system processor 135 checked with the image sensor 105 was dirty), when the host vehicle 100 is at a certain location (e.g., a parking garage or service facility), after the host vehicle 100 has gone through a predetermined number of key cycles, etc. As such, the system processor 135 need not analyze every image captured by the image sensor 105.

Checking whether the image sensor 105 needs to be cleaned may include the system processor 135 being programmed to look for the predetermined object in images captured by the image sensor 105, selecting an image with the predetermined object, manipulating the image with the predetermined object, and analyzing the manipulated image. Looking for images with the predetermined object may include the system processor 135 performing an image processing technique. The result of performing the image processing technique may include the system processor 135 identifying the predetermined image in the image. Manipulating the image may include the system processor 135 cropping out (i.e., digitally removing) sections of the image that do not represent the predetermined object. Manipulating the image may further include normalizing the image. Normalizing the image may include the system processor 135 adjusting the exposure, brightness levels, orientation, etc. of the image or the predetermined object in the image. What remains after manipulating the image may be the "captured image" referred to above.

To determine whether the image sensor 105 needs to be cleaned, the system processor 135 may compare the captured image to the target image. That is, the system processor 135 may be programmed to perform an image processing technique that detects the amount of noise in the captured image relative to that of the target image. The system processor 135 may be programmed to quantify the amount of noise based on the differences between the captured image and the target image. The noise may be quantified using any number of characteristics, including combinations of characteristics. For example, the noise may be a signal-to-noise ratio (SNR), peak signal-to-noise ratio (PSNR), root mean squared error (RMSE), mean absolute error (MAE), or the like. Each of these characteristics may be associated with a different threshold. For instance, the SNR and PSNR may decrease as image noise increases. On the other hand, RMSE and MAE may increase as image noise increases. If the system processor 135 determines that the noise of the captured image relative to the target image based on these characteristics, individually or in any combination, is outside acceptable limits, the system processor 135 may initiate cleaning of the image sensor 105. Initiating cleaning of the image sensor 105 may include the system processor 135 generating a control signal to activate the sensor cleaning system 125, scheduling a cleaning of the image sensor 105 at, e.g., a service station, or the like. Scheduling the cleaning of the image sensor 105 at the service station may include the system processor 135 generating a command for the communications transceiver 120 to transmit a message to the remote server 145. The message may indicate that the image sensor 105 requires cleaning, a request for a time that the host vehicle 100 can be serviced, or the like. The system processor 135 may be programmed to process a response from the remote server 145 as well as respond to messages received from the remote server 145.

Figure 3A:
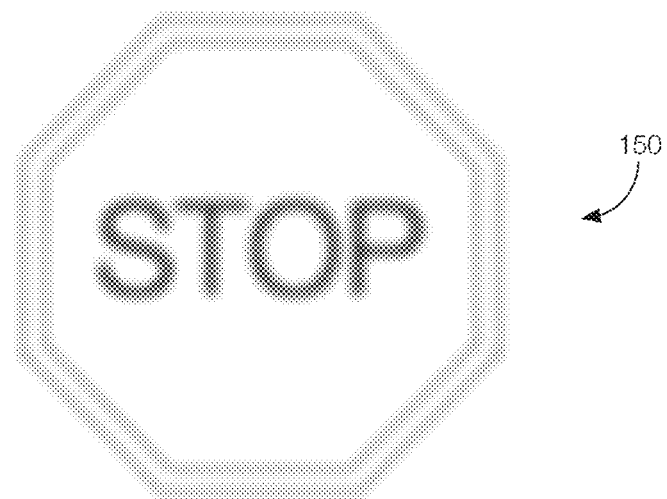
FIG. 3A illustrates an example image captured by the image sensor.

FIG. 3A illustrates an example captured image 150. The captured image 150 is captured by the image sensor 105 during operation of the host vehicle 100. As explained above, the system processor 135 periodically monitors captured images 150 for predetermined objects. A predetermined object may be an object associated with one or more target images 155 stored in the system memory 130. In the example of FIG. 3A, the predetermined object is a stop sign. The system processor 135 may be programmed to identify the stop sign in the original image captured by the image sensor 105, and perform one or more image processing techniques to isolate the image of the stop sign. That is, the system processor 135 may crop the image, brighten the image, adjust the exposure, adjust the orientation of the image, etc. The result of such processing may be the captured image 150 shown in FIG. 3A. Moreover, the blurriness of the captured image 150 shown in FIG. 3A indicates that the lens 115 of the image sensor 105 is obstructed with debris and needs to be cleaned.

Figure 3B:
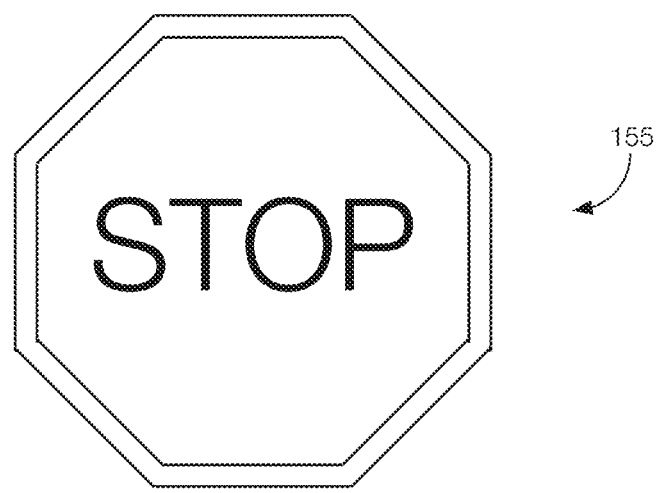
FIG. 3B illustrates an example target image used by the debris detection system.

FIG. 3B illustrates an example target image 155 used by the debris detection system 110. Continuing the example discussed above with regard to FIG. 3A, the target image 155 may be a clear image of a stop sign. Thus, the target image 155 may represent how an image of a stop sign would look if captured at a time when no debris is on the lens 115 of the image sensor 105.

As explained above, the system processor 135 may be programmed to compare the captured image 150 to the target image 155 to quantify the amount of noise in the captured image 150. If the amount of noise is outside acceptable limits, the system processor 135 may be programmed to initiate cleaning of the lens 115 of the image sensor 105. Initiating cleaning may include activating a sensor cleaning system 125 (e.g., spraying washer fluid and activating a wiper to wipe away the washer fluid and debris) or scheduling maintenance at a service station.

Figure 4:
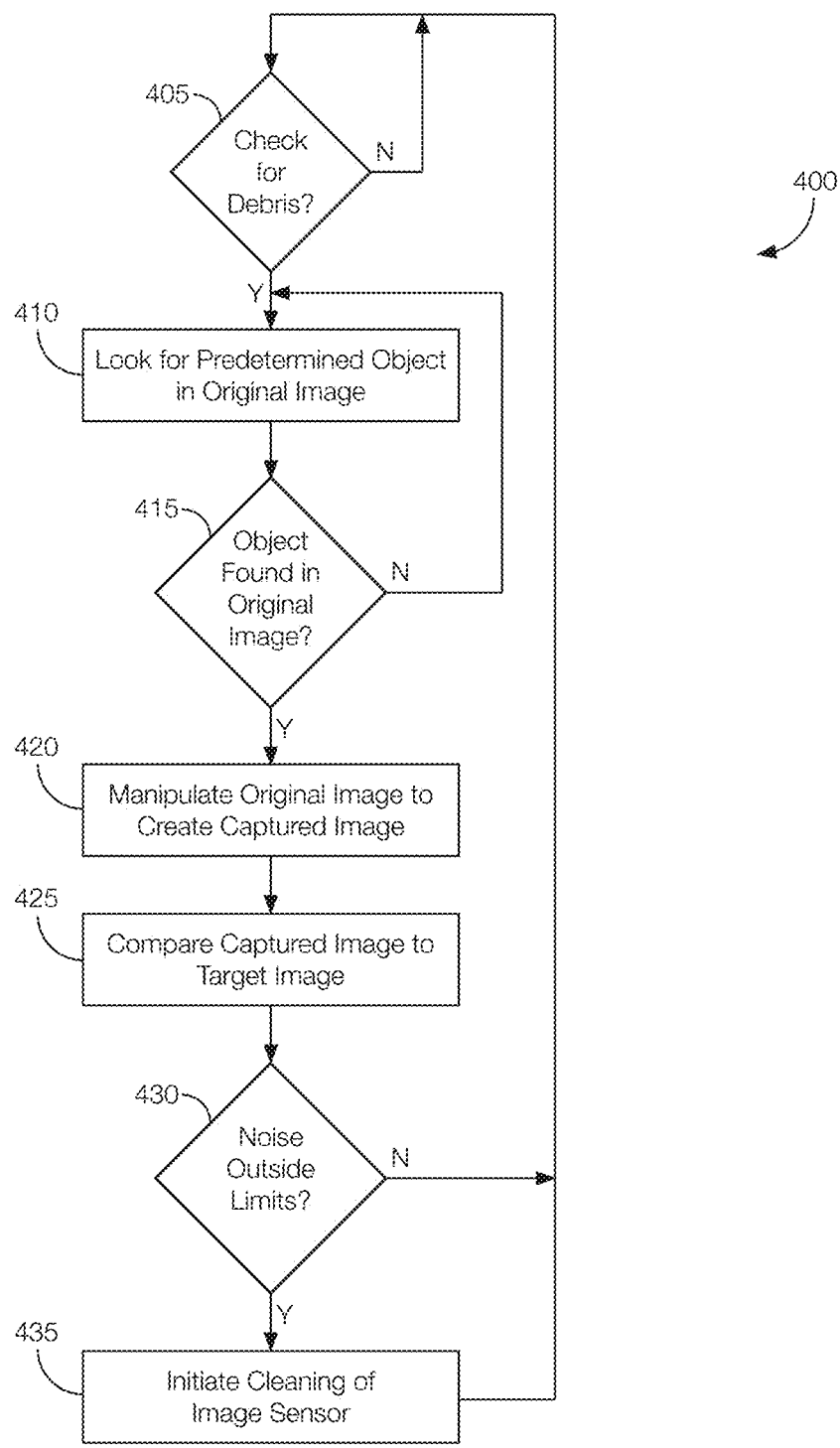
FIG. 4 is a flowchart of an example process that may be executed by the debris detection system.

FIG. 4 is a flowchart of an example process 400 that may be implemented by the debris detection system 110. The process 400 may be executed any time the host vehicle 100 is operating and may continue to execute until, e.g., the host vehicle 100 is shut down. In some instances, the process 400 may be executed even though the host vehicle 100 is not in use. For instance, the process 400 may execute while the host vehicle 100 is parked and the ignition is off. That way, the process 400 can be used to detect debris on the image sensor 105 before the host vehicle 100 needs to rely on the image sensor 105 for, e.g., autonomous vehicle operations.

At decision block 405, the debris detection system 110 determines whether it is time to check for debris on the lens 115 of the image sensor 105. For instance, the system processor 135 may be programmed to determine if a predetermined amount of time has elapsed since the last time the process 400 was executed, whether the host vehicle 100 was driven a predetermined distance (based on, e.g., miles, kilometers, etc.) since the last time the process 400 was executed, whether the host vehicle 100 is at a certain location (e.g., a parking garage or service facility), whether the host vehicle 100 has gone through a predetermined number of key cycles sine the last time the process 400 was executed, etc. If the system processor 135 determines that it is time to check for debris on the image sensor 105, the process 400 may proceed to block 410. Otherwise, the process 400 continues to execute block 405 until the system processor 135 determines that it is time to proceed. The system processor 135 may be programmed to wait some amount of time or for a specific event to occur before executing block 405 again.

At block 410, the debris detection system 110 looks for the predetermined object in images captured by the image sensor 105. The system processor 135 may perform an image processing technique to determine if an original image captured by the image sensor 105 includes the predetermined object. As discussed above with regard to FIGS. 3A and 3B, the predetermined object may include, e.g., a stop sign. The predetermined object need not be a stop sign, however. That is, the predetermined object may be any object with a relatively standardized appearance, as explained above.

At decision block 415, the debris detection system 110 determines whether the predetermined object appears in an original image captured by the image sensor 105. If the system processor 135 determines that the predetermined object is in an original image captured by the image sensor 105, the process 400 may proceed to block 420. Otherwise, the process 400 may return to block 410 so additional images can be analyzed for the predetermined object.

At block 420, the debris detection system 110 manipulates the image with the predetermined object. The system processor 135 may manipulate the image to generate the "captured image." Manipulating the image may include the system processor 135 cropping out sections of the image that do not include the predetermined object. Manipulating the image may further include normalizing the image. Normalizing the image may include the system processor 135 adjusting the exposure, brightness levels, orientation, etc., of the predetermined object in the image. What remains after manipulating the image may be the "captured image" referred to above.

At block 425, the debris detection system 110 compares the captured image to the target image. The system processor 135 compares the captured image to the target image to quantify the amount of noise (e.g., a noise characteristic) in the captured image. That is, differences of the captured image relative to the target image may be interpreted as noise caused by debris on the lens 115 of the image sensor 105. The noise may be quantified using any number of characteristics, including combinations of characteristics. For example, the noise characteristic may be a signal-to-noise ratio (SNR), peak signal-to-noise ratio (PSNR), root mean squared error (RMSE), mean absolute error (MAE), or the like.

At decision block 430, the debris detection system 110 compares the quantified noise characteristic to one or more thresholds. That is, the system processor 135 may compare the quantified noise to one or more acceptable limits. The SNR and PSNR may decrease as image noise increases. On the other hand, RMSE and MAE may increase as image noise increases. Thus, if the SNR, PSNR, or both drop below their respective thresholds, and/or if the RMSE and MAE exceed their respective thresholds, the system processor 135 may determine that the quantified noise is outside acceptable limits. If the system processor 135 determines that the noise of the captured image relative to the target image based on these characteristics, individually or in any combination, is outside acceptable limits, the process 400 may proceed to block 435. Otherwise, the process 400 may return to block 405. The system processor 135 may be programmed to wait some amount of time or for a specific event to occur before executing block 405 again.

At block 435, the debris detection system 110 initiates cleaning of the image sensor 105. The system processor 135 may initiate cleaning of the image sensor 105 by, e.g., outputting control signals to the sensor cleaning system 125. The sensor cleaning system 125 may spray the lens 115 of the image sensor 105 with washer fluid and activate wiper to wipe the washer fluid and debris off the lens 115 in response to receiving the control signal from the system processor 135. Alternatively or in addition, the system processor 135 may schedule a cleaning of the image sensor 105 at a service station. Scheduling the cleaning of the image sensor 105 at the service station may include the system processor 135 generating a command for the communications transceiver 120 to transmit a message to the remote server 145. The message may indicate that the image sensor 105 requires cleaning, a request for a time that the host vehicle 100 can be serviced, or the like. The system processor 135 may be programmed to process a response from the remote server 145 as well as respond to messages received from the remote server 145.

The process 400 may return to block 405 after block 435. The system processor 135 may be programmed to wait some amount of time or for a specific event to occur before executing block 405 again.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computer comprising:
a memory; and
a processor programmed to execute instructions stored in the memory, the instructions include comparing a captured image of a predetermined object to a target image of the predetermined object to quantify a first noise characteristic of the captured image, comparing the first noise characteristic to a first predetermined threshold, and detecting debris on an image sensor that outputs the captured image as a result of comparing the first noise characteristic to the first predetermined threshold.

2. The vehicle computer of claim 1, wherein the first noise characteristic is at least one of a signal-to-noise ratio and a peak signal-to-noise ratio and wherein detecting debris on the image sensor includes detecting debris on the image sensor as a result of determining that the first noise characteristic is below the first predetermined threshold.

3. The vehicle computer of claim 2, wherein the instructions include comparing the captured image to the target image to quantify a second noise characteristic of the captured image, wherein the second noise characteristic includes at least one of a root mean squared error and a mean absolute error, and wherein detecting debris on the image sensor includes detecting debris on the image sensor as a result of determining that the second noise characteristic exceeds a second predetermined threshold.

4. The vehicle computer of claim 3, wherein detecting debris on the image sensor includes detecting debris on the image sensor as a result of the determining that the first noise characteristic is below the first predetermined threshold and the second noise characteristic exceeds the second predetermined threshold.

5. The vehicle computer of claim 1, wherein the instructions include initiating cleaning of the image sensor as a result of detecting debris on the image sensor.

6. The vehicle computer of claim 5, wherein initiating cleaning of the image sensor includes outputting a control signal to a sensor cleaning system.

7. The vehicle computer of claim 1, wherein the instructions include identifying the predetermined object in an original image captured by the image sensor.

8. The vehicle computer of claim 1, wherein the instructions include generating the captured image by manipulating the original image captured by the image sensor.

9. The vehicle computer of claim 8, wherein manipulating the original image includes at least one of cropping the original image and normalizing the original image.

10. The vehicle computer of claim 9, wherein normalizing the original image includes adjusting at least one of an exposure, a brightness, and an orientation of the predetermined object in the original image.

11. The vehicle computer of claim 9, wherein cropping the original image includes removing sections of the original image that do not represent the predetermined object.

12. A method comprising:
  comparing a captured image of a predetermined object to a target image of the predetermined object to quantify a first noise characteristic of the captured image;
  comparing the first noise characteristic to a first predetermined threshold; and
  detecting debris on an image sensor that outputs the captured image as a result of comparing the first noise characteristic to the first predetermined threshold.

13. The method of claim 12, wherein the first noise characteristic is at least one of a signal-to-noise ratio and a peak signal-to-noise ratio and wherein detecting debris on the image sensor includes detecting debris on the image sensor as a result of determining that the first noise characteristic is below the first predetermined threshold.

14. The method of claim 13, further comprising comparing the captured image to the target image to quantify a second noise characteristic of the captured image, wherein the second noise characteristic includes at least one of a root mean squared error and a mean absolute error, and wherein detecting debris on the image sensor includes detecting debris on the image sensor as a result of determining that the second noise characteristic exceeds a second predetermined threshold.

15. The method of claim 14, wherein detecting debris on the image sensor includes detecting debris on the image sensor as a result of the determining that the first noise characteristic is below the first predetermined threshold and the second noise characteristic exceeds the second predetermined threshold.

16. The method of claim 12, further comprising initiating cleaning of the image sensor as a result of detecting debris on the image sensor.

17. The method of claim 12, further comprising identifying the predetermined object in an original image captured by the image sensor.

18. The method of claim 12, further comprising generating the captured image by manipulating the original image captured by the image sensor, wherein manipulating the original image includes at least one of cropping the original image and normalizing the original image.

19. The method of claim 18, wherein normalizing the original image includes adjusting at least one of an exposure, a brightness, and an orientation of the predetermined object in the original image.

20. The method of claim 18, wherein cropping the original image includes removing sections of the original image that do not represent the predetermined object.

* * * * *